United States Patent [19]

Abe et al.

[11] 4,081,414

[45] Mar. 28, 1978

[54] HOT MELT ADHESIVE COMPOSITION FOR HOT MELT BONDING OF FIBROUS OR SURFACE-POROUS MATERIALS

[75] Inventors: Mitsuo Abe; Tetsuo Murata; Minoru Furuichi; Nobuhide Shiraishi; Shohei Wada; Seiji Tai; Tsukasa Maeda, all of Yokkaichi, Japan

[73] Assignee: Japan Synthetic Rubber Co., Ltd., Tokyo, Japan

[21] Appl. No.: 639,837

[22] Filed: Dec. 11, 1975

[30] Foreign Application Priority Data

Dec. 21, 1974 Japan .............................. 49-147174

[51] Int. Cl.$^2$ ............................................ C08L 91/00
[52] U.S. Cl. ...................... 260/23.7 R; 260/19 UA; 260/27 BB; 260/28.5 B; 260/30.6 R; 260/31.8 PQ; 260/33.6 A; 260/42.47; 260/845; 260/887; 260/889
[58] Field of Search .................. 260/42.37, 24, 27 BB, 260/23.7 R, 23.3, 19 UA, 28.5 B, 889, 887

[56] References Cited

U.S. PATENT DOCUMENTS

| | | | |
|---|---|---|---|
| 3,745,054 | 7/1973 | Smedberg | 260/887 X |
| 3,852,225 | 12/1974 | Ishikawa et al. | 260/889 X |
| 3,891,724 | 6/1975 | Yaeda et al. | 260/889 |
| 3,914,489 | 10/1975 | Smedberg | 260/887 X |

*Primary Examiner*—Lewis T. Jacobs

[57] ABSTRACT

A hot melt adhesive composition consisting essentially of 100 parts by weight of polybutadiene having a 1,2-bond structure content of not less than 70% and a crystallinity of not less than 10%, from 50 to 1000 parts by weight of at least one inorganic filler, from 10 to 300 parts by weight of at least one tackifier, and at least one plasticizer and/or at least one flow improving agent, said composition having melt viscosity of from 50 to 50000 poises within a temperature range from 100° to 150° C.

17 Claims, 2 Drawing Figures

HOT MELT ADHESIVE COMPOSITION FOR HOT MELT BONDING OF FIBROUS OR SURFACE-POROUS MATERIALS

This invention relates to a hot melt adhesive composition and process for hot melt bonding of fibrous or surface-porous materials, such as woven and non-woven fabrics, carpets and rugs, paper and boards, plastic and synthetic rubber foams, and wood and wood products. More particularly, the invention is concerned with a hot melt adhesive composition based on a polybutadiene composed chiefly of a 1,2-bond structure (and therefore called "1,2-polybutadiene" hereinafter) with additives including an inorganic filler, tackifier, plasticizer, and flow improving agent, and a process for bonding such fibrous or surface-porous materials by the aid of the adhesive composition.

Heretofore, synthetic rubber latex compounds, natural rubber solutions, and various types of thermoplastic resins in film or sheet forms have been employed as adhesives for joining fibrous and surface-porous materials. Those adhesives have a number of problems, however. For example, the synthetic rubber latex compounds and natural rubber solutions usually require vulcanization and hence elevated temperature and extended time for processing, necessitating the use of large-size equipment.

Moreover, such prior adhesives require a time-consuming step of complete drying for the removal of moisture and solvent. The prolonged work period tends to do harm to the fibrous or surface-porous materials and so many process steps are needed for fulfilling the original purposes that the productivity is adversely affected.

Where a synthetic rubber latex compound is used, the waste water from the fiber treatment plant must be treated for purification. In the case of a natural rubber solution, the organic solvent contained therein will pose problems because of its unfavorable influence upon human health.

In an effort to solve these problems, hot melt adhesives based on thermoplastic resins have been developed. The use of those resins alone for hot melt adhesion involves various difficulties, and, usually with the view to improving the quality of the main ingredient and reducing the cost, such a thermoplastic resin is compounded with additives and is employed in the form of a composition. The thermoplastic resin, which forms the base of the hot melt adhesive is in most cases a styrene-butadiene block copolymer (hereinafter called an "SBS copolymer"), styrene-isoprene block copolymer ("SIS copolymer"), ethylene-vinyl acetate copolymer ("EVA copolymer") or the like. For special applications polyamides and polyesters are in use but the volume is negligible because of their expense and poor processability.

The most common bonding methods are to place such a hot melt adhesive in a melt pressure gun for spot bonding or to extrude the composition into a film or sheet form for subsequent hot melt adhesion. These methods are considerable improvements over the above-mentioned ones that involve vulcanization, in respect of processing time, size of equipment required, and the effect on the working environment.

However, the thermoplastic resins for bonding applications have drawbacks. The commercially available SBS copolymer-based compositions, when used as hot melt adhesives will require rather high temperatures for the compounding and film or sheet forming operations, with increased difficulty in processing. Further, in order to provide adequate adhesion, the compositions must be heated to relatively high temperatures and there is considerable possibility of impairing the quality of the fibrous or surface porous materials.

The SIS copolymer-based compositions too have the following problems yet to be solved before they can perform satisfactorily as hot melt adhesive. They require mixing temperatures usually as high as those required for the SBS copolymer-based adhesives, and then resulting films or sheets possess such high self-stickiness that they are very difficult to handle. Thus, they present various problems in processability prior to the actual use for bonding purposes.

On the other hand, the EVA copolymer-based compositions as hot melt adhesive are superior to those based on the SBS and SIS copolymers in both processability during the mixing operation and hot melt adhesion at low temperatures. They provide good bonding strength.

Nevertheless, the EVA copolymer-based compositions have an inherent disadvantage in that during hot melt bonding they tend to ooze out through the interstices or pores of the fibrous or surface-porous materials to mar the outward appearance. When exposed to high temperature, the adhesives may exude to the surfaces of the bonded or laminated articles to impair the surface appearance. Further, upon lamination, the fibrous or surface-porous materials, such as woven and non-woven fabrics, carpets, and paper, will become rather rigid with poor feel or hand. The laminates of such materials lack rubbing resistance and are easily delaminated by repeated rumpling.

As described, the hot melt adhesives commercially available at the present time have a variety of problems still to be overcome.

With these in view, we have made intensive investigations and have now found that compositions based on a 1,2-polybutadiene having both 1,2-bond structure content and crystallinity within certain ranges provide hot melt adhesives which will be harmless to fibrous and surface-porous materials, will produce excellent bond strength after hot melt adhesion at relatively low temperature, and will not exude upon hot melt bonding or exposure to high temperature, thus retaining the good appearance, flexibility, and rumpling resistance. The present invention is predicated upon this discovery.

According to the invention, a process for hot melt bonding of fibrous or surface-porous materials is provided which is characterized by the use, as the hot melt adhesive, of a composition having a melt viscosity of from 50 to 50,000 poises within a temperature range from 100° to 150° C, which composition is prepared by mixing 100 parts by weight of a polybutadiene having a 1,2-bond structure content of not less than 70% and a crystallinity of not less than 10% with from 50 to 1000 parts by weight of an inorganic filler, from 10 to 300 parts by weight of a tackifier, a plasticizer, and/or a flow improving agent.

The 1,2-polybutadiene which may be used in the present invention has a 1,2-bond structure content of over 70%, preferably not less than 80%, and a crystallinity of not less than 10%, preferably between 10 and 50%. In addition, the 1,2-polybutadiene is desired to have an intrinsic viscosity $[\eta]$ of from 0.7 to 3.0, preferably from 1.0 to 2.0, as measured in toluene at 30° C. Such a 1,2-polybutadiene can be produced, for example, by the methods disclosed in U.S. Pat. No. 3,498,963 (British Patent No. 1,158,296, Deutsche Patentanmeldung P1720998.2) or U.S. Pat. No. 3,522,332 (British Patent No. 1,189,257, Deutsche Auslegeschrift 1,770,545).

With a 1,2-bond structure content or crystallinity outside the range above specified, the advantages of the invention are not obtained. When the 1,2-bond structure content falls short of the specified range, the polybutadiene will provide an adhesive which is rather rubberlike, difficult to process, and inferior in bond strength. When the crystallinity is below the indicated range, adequate bond strength will not result, but when it becomes more than 50%, the softening temperature of the 1,2-polybutadiene will increase, making the compounding and mixing operation difficult. For instance, where a fibrous base material of carpet is to be hot melt bonded, it is desirable to use, as the hot melt adhesive, a composition having a melt viscosity of from 100 to 5000 poises at 130° C obtained by mixing 100 parts by weight of 1,2-polybutadiene as a chief ingredient containing not less than 70% 1,2-bond structure and having a crystallinity of from 10 to 50% and desirably an intrinsic viscosity $[\eta]_{30^\circ C}^{toluene}$ of from 1.0 to 2.0, with from 100 to 700 parts by weight, preferably from 200 to 400 parts by weight, of a filler, from 50 to 300 parts by weight, preferably from 100 to 200 parts by weight, of a tackifier, and a plasticizer and/or flow improving agent where necessary.

In the present invention the inorganic filler is used to increase the volume, reduce the cost, and improve the properties such as adhesive strength and processability of the hot melt adhesives. Desirably it takes a particle or other form ranging in size from 0.01 to 100 μ. As the filler, for example, calcium carbonate, aluminum hydroxide, talc, or clay may be preferably used. Furthermore more than one of said fillers can be used mixed together. Addition of less than the amount specified will increase the cost of the adhesive, and an excessive addition will reduce the bond strength.

The tackifier is added to the composition in order to increase the tackiness of the adhesive and provide an excellent bond strength to the surface of the product. Examples of useful tackifiers are rosin and rosin derivatives, pinene polymers, dipentene polymers, cumaroneindene resin, petroleum resin, and atactic polypropylene. More than one kind of tackifier may be used in the compositions. When the amount of such a tackifier is below the specified range, the bond strength of the resulting adhesive will not be adequate. When the tackifier amount is excessive, the adhesive will have such a low melt viscosity that difficulties will be encountered in the compounding and film or sheet forming operations, with a possibility of bleeding during hot melt adhesion. In addition, the physical properties of the adhesive and hence of the bond will be affected unfavorably.

The plasticizer is used to confer increased processability, flexibility, and low-temperature resistance on the hot melt adhesives. Usually it is a liquid organic substance of low volatility, for example, an ester of a phthalic acid derivative, naphthenic oil, or aromatic oil. It is possible to use more than one kind of plasticizer.

The flow improving agent provides added processability, increased surface hardness, and resistance to blocking and stringiness. Among useful fluidizers are paraffin wax, microcrystalline wax, and low molecular weight polyethylene. It is possible to use more than one kind of flow improving agent. One or both of said plasticizer and flow improving agent can be used. A major difference between a plasticizer and a flow improving agent lies in the fact that the latter does not decrease the rigidity of the hot melt adhesive at ordinary temperature.

Addition of the plasticizer and/or flow improving agent permits the apparent melt viscosity of the hot melt adhesive composition to be adjusted within the specified range. If the melt viscosity of the hot melt adhesives is below that range, problems tend to arise in connection with the processability during compounding and film or sheet forming operations or with the possibility of bleeding during hot melt adhesion. This also will have a detrimental effect upon the physical properties of the resulting bond. Conversely if the viscosity is excessive, the processability for adhesion and the bond strength will become inadequate, depriving the composition of its desired features.

It is only when the above-mentioned compounding agents are added in suitable proportions to meet the property requirements of the particular adhesive that a satisfactory hot melt adhesive can be prepared.

While the 1,2-polybutadiene-based adhesive composition is desirably used in a film or sheet form, it is, of course, possible instead to impregnate a fibrous or surface-porous material with such a composition and then carry out the hot melt adhesion or, as a further alternative, to apply the adhesive composition to the base material by means of a melt pressure gun. The film or sheet of the 1,2-polybutadiene-based composition may easily be formed by the usual methods used for thermoplastic resins, e.g., by the flat die method or by calendering.

For the purposes of the invention the term "fibrous or surface-porous materials" is used to mean generally, though not limited to, various woven or nonwoven fabrics and carpets of synthetic, chemical and natural fibers, paper and paper products, plastics, artificial leathers, and plastic or synthetic rubber foams. The material may also be a natural leather, felt, or wood. In brief, any substrate may be employed provided that its surface is porous. In bonding by the hot melt technique, the same or dissimilar materials may be combined as desired.

There is no special limitation to the procedure for hot melt adhesion in accordance with the present invention. The adhesive may easily be applied by means of various press rolls. Alternatively, the fibrous or porous material may be bonded simultaneously with the sheet forming the hot melt adhesive composition. The adhesive composition for use in the invention may contain an anti-oxidant, lubricant, flame-retardant, and other additives according to the requirements.

Using the compositions of the invention, strong bonds are formed by hot melt adhesion not only at 150° C, the appropriate temperature for the conventional hot melt technique, but also at relatively low temperatures such as 100° – 150° C. The hot melt adhesion when accomplished in conformity with the invention will give a bonded construction of fibrous or surface-porous material which retains flexibility and rumpling resistance without bleeding of the adhesive during hot melt bonding or during subsequent exposure to elevated temperature.

Figure 1:
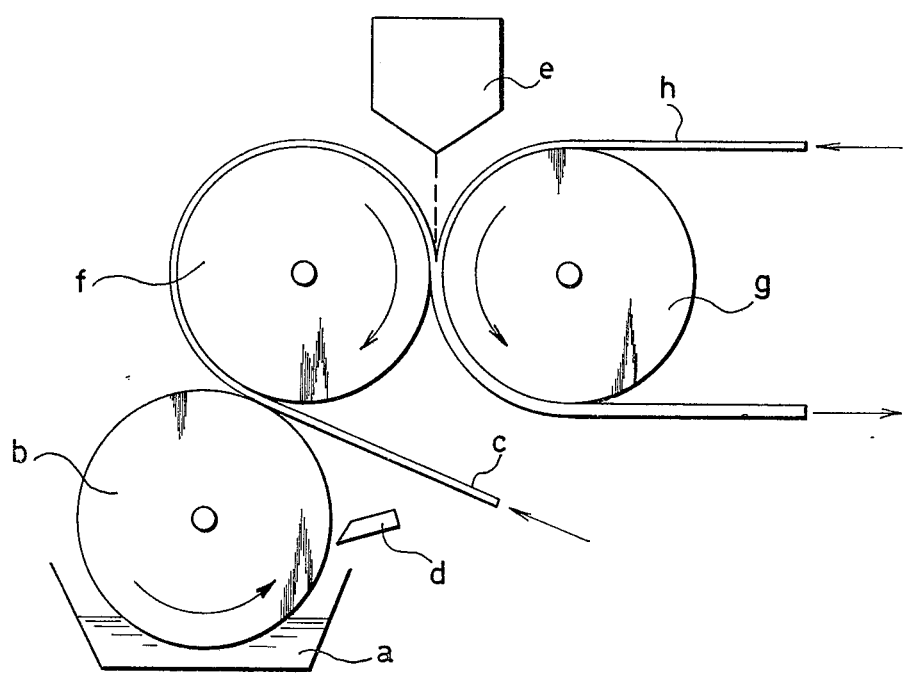
FIG. 1 is a schematic view of the apparatus for bonding layers in accordance with the invention.

The present invention will be more fully illustrated by reference to the following examples, which are not to be construed to limit the scope of the invention. In Examples 1 and 6, 1,2-polybutadiene-based compositions are compared with SBS copolymer- and SIS copolymer-based compositions. The SBS copolymer-based compositions provided poor adhesiveness, and the SIS copolymer-based composition gave films or sheets very difficult to handle. For these reasons, the 1,2-polybutadiene-based compositions in the rest of the examples were compared with reference compositions based on synthetic rubber latex compounds and EVA copolymers.

In these examples, the microstructures of 1,2-polybutadienes were determined by the infrared absorption spectrum method proposed by D. Morero et al. [Chim. e. Ind. 41 758 (1959)]. The degrees of crystallization of crystallinity were found on the basis of the density method. For the calculations the 1,2-polybutadiene having a 100% crystallinity was assured to have a density of 0.963 as taught by Natta [J. Polymer Sci., 20 25 (1956)]. The density of the 1,2-polybutadiene with a crystallinity of 0% was assumed to be 0.892, or the density of that which had been confirmed to be amorphous by an X-ray analysis in the literature (U.S. Pat. No. 3,498,963, British Patent No. 1,158,296, Deutsche Patentanmeldung P1720998.2).

EXAMPLE 1

Three different compositions were prepared. To each 100 parts by weight of a 1,2-polybutadiene having a 1,2-bond structure content of 90%, crystallinity of 24%, and intrinsic viscosity $[\eta]_{30°}\ c^{toluene}$ of 1.18, an SBS (Cariflex TR-1101; Chell Chem.) copolymer having a styrene content of 30% by weight, or an SIS (Cariflex TR-1107; Chell Chem.) copolymer having a styrene content of 14% by weight, were added 300 parts by weight of an inorganic filler (calcium carbonate; particle size 2 $\mu$), 300 parts by weight of a tackifier (atactic polypropylene), and 10 parts by weight of a plasticizer (naphthenic oil). Each composition was compounded on a Brabender plastograph at a speed of 40 rpm at 125° C. The maximum torque attained by the 1,2-polybutadiene-based composition was 1700 g-m, that by the SBS copolymer-based composition was 2300 g-m, and that by the SIS copolymer-based composition was 2100 g-m. The 1,2-polybutadiene-based composition thus demonstrated the ease of compounding (Exp. No. 1).

The same compositions were kneaded by mixing roll at 80° C. The one based on 1,2-polybutadiene was completely mixed in 15 minutes, whereas the other two compositions SBS and SIS took from 40 to 50 minutes (Ref. Ex. Nos. 1 and 2).

Altogether, the experiments indicated that the 1,2-polybutadiene-based composition is capable of being compounded and kneaded with ease.

EXAMPLE 2

To 100 parts by weight of a 1,2-polybutadiene having a 1,2-bond structure content of 90%, crystallinity of 24%, and intrinsic viscosity $[\eta]_{30°}\ c^{toluene}$ of 1.30 were added varying proportions as shown in Table 1 of an inorganic filler (calcium carbonate), tackifiers (petroleum resin "Toho Hi-Resin No. 60"; Toho Chemical Industry Co., Ltd. and atactic polypropylene), plasticizer (naphthenic oil), and a flow improving agent (145° F paraffin wax). The compositions thus obtained were kneaded by mixing roll at from 70° to 80° C for 15 minutes and then pressed at 130° C for 3 minutes to form 200 $\mu$-thick sheets. Each sheet was sandwiched between two sheets of 500 $\mu$-thick fabric of natural fiber (cotton). The sandwich combination was preheated to 110° C on a hot press and then was hot melt bonded with a pressure of 0.5 kg/cm² for 1 second. The bond strength and bleeding of the adhesive from each test piece were determined. The results are given in Table 1.

In a similar manner a commercially available rubber latex based on a carboxyl-modified styrene-butadiene copolymer (Japan Synthetic Rubber's "JSR-CL200", 60% solids) was applied on the inner sides of two sheets of natural fiber (cotton) fabric at a solid coating rate of 0.92 kg/m².

Table 1

| | (in parts by weight) Exp. No. | | | | | | | Ref. Ex. No. | | |
|---|---|---|---|---|---|---|---|---|---|---|
| | 2 | 3 | 4 | 5 | 6 | 7 | 8 | 3 | 4 | 5 |
| Calcium carbonate | 100 | 100 | 200 | 200 | 300 | 300 | 300 | 50 | 500 | |
| Petroleum resin | 30 | 10 | 40 | 20 | 20 | 30 | 20 | 150 | 20 | Synthetic rubber latex compound |
| Paraffin wax | 20 | 60 | 20 | 60 | 40 | 60 | 80 | 120 | 80 | |
| Naphthenic oil | 20 | 10 | 10 | 20 | 10 | 15 | 20 | 10 | 20 | |
| Atactic polypropylene | 6 | 12 | 8 | 5 | 6 | 8 | — | — | — | |
| 1,2-Polybutadiene | 100 | 100 | 100 | 100 | 100 | 100 | 100 | 100 | 100 | |
| App. melt viscosity (poise) | 4900 | 1600 | 12000 | 2300 | 21000 | 4600 | 3700 | 41 | 81000 | |
| Peeling strength (g/cm) | 1990 | 1450 | 980 | 1200 | 760 | 790 | 1650 | 2440 | 180 | 200 |
| Bleeding | No | No | No | No | No | No | No | Yes | No | No |

Notes:
(1) Melt viscosity: Determined with Shimadzu Seisakusho's Koka type flow meter using a nozzle 1 mm dia. × 15 mm, under loading of 10 kg/cm² at 130° C.
(2) Peeling strength: 20 mm-wide strips cut out of the hot melt bonded fibrous material were subjected to T-peeling on an Instron type universal tester (at a tensile velocity of 500 mm/min), and the mean value of the peeling stresses exerted was used as an indication of adhesiveness or peeling strength.
(3) Bleeding of adhesive: The hot melt bonded fibrous material was allowed to stand in an air oven at 140° C for one hour and was visually inspected for bleeding.

The two sheets were pressed together by pressure rolls (at 25° C), subjected to a curing treatment in an air oven at 150° C for 15 minutes, and the bond strength was determined. The results showed that the 1,2-polybutadiene-based compositions having apparent melt viscosity values within the range specified in accordance with the invention provide excellent adhesion and no bleeding.

EXAMPLE 3

The procedure of Example 2 was repeated with the exception that different types of 1,2-polybutadienes were used. The results are summarized in Table 2.

Table 2

|  | Exp.No. 9 | (in parts by weight) Ref.Ex.No. 6 | 7 | 8 |
|---|---|---|---|---|
| Calcium carbonate | 200 | 200 | 200 | 200 |
| Petroleum resin | 30 | 30 | 30 | 30 |
| Atactic polypropylene | 12 | 12 | 12 | 12 |
| Naphthenic oil | 5 | 5 | 5 | 5 |
| Paraffin wax (145° F) | 40 | 40 | 40 | 40 |
| 1,2-Polybutadiene (1) | 100 | — | — | — |
| 1,2-Polybutadiene (2) | — | 100 | — | — |
| 1,2-Polybutadiene (3) | — | — | 100 | — |
| Cis-1,4-polybutadiene | — | — | — | 100 |
| Apparent melt viscosity (poise) | 8000 | 9000 | 43000 | 78000 |
| Peeling strength (g/cm) | 980 | 350 | 300 | 280 |

Note:

|  | 1,2-bond structure content (%) | crystallinity (%) | $[\eta]_{30°C}^{toluene}$ |
|---|---|---|---|
| 1,2-Polybutadiene (1) | 90 | 24 | 1.40 |
| (2) | 90 | 5 | 2.10 |
| (3) | 45 | — | 2.30 |
| Cis 1,4-polybutadiene | Cis 1,4-bond 97 | — | 2.80 |

EXAMPLE 4

To 100 parts by weight of a 1,2-polybutadiene having a 1,2-bond structure content of 90%, crystallinity of 17%, and intrinsic viscosity $[\eta]_{30°}$ $c^{toluene}$ of 1.19 were added varying parts by weight as shown in Table 3 of an inorganic filler (calcium carbonate), tackifiers (petroleum resin "Toho Hi-Resin No. 60" and atactic polypropylene), plasticizer (naphthenic oil), and a flow improving agent (145° F paraffin wax). The compositions prepared in the manner described were kneaded by mixing roll at from 70° to 80° C for 15 minutes and then pressed at 130° C for 3 minutes to form 200 μ-thick sheets. Each sheet was sandwiched between two sheets of 500 μ-thick fabric of natural fiber (cotton), and the sandwich combination was preheated to 110° C on a hot press and then was hot melt bonded with a pressure of 0.5 kg/cm² for 1 second. The bond strength and bleeding of the adhesive from each test piece were determined, and the results were compiled in Table 3. It will be seen that the 1,2-polybutadiene-based compositions produce excellent bonds with no danger of bleeding.

EXAMPLE 5

Two hot melt compositions were prepared. To each 100 parts by weight of a 1,2-polybutadiene having a 1,2-bond structure content of 90%, crystallinity of 24%, and intrinsic viscosity $[\eta]_{30°}$ $c^{toluene}$ of 1.23 or an EVA copolymer (Everflex P-2807; Mitsui Polychemical Co., Ltd.) having a vinyl acetate content of 28 wt.% were added an inorganic filler (calcium carbonate, tackifier (atactic polypropylene), and plasticizer (naphthenic oil) in parts by weight as given in Table 4.

Table 3

|  | (in parts by weight) Exp. No. 10 | 11 | 12 |
|---|---|---|---|
| Calcium carbonate | 100 | 200 | 300 |

Table 3-continued

|  | (in parts by weight) Exp. No. 10 | 11 | 12 |
|---|---|---|---|
| Petroleum resin | 30 | 40 | 20 |
| Paraffin wax | 20 | 20 | 40 |
| Naphthenic oil | 20 | 10 | 10 |
| Atactic polypropylene | 6 | 8 | 6 |
| 1,2-Polybutadiene | 100 | 100 | 100 |
| Apparent melt viscosity (poise) | 5300 | 14000 | 25000 |
| Peeling strength (g/cm) | 2150 | 810 | 720 |
| Bleeding | No | No | No |

Note:
Melt viscosity, peeling strength and bleeding were determined by the same methods as used in Example 2.

The resulting compositions were kneaded by mixing roll at from 70° to 80° C for 15 minutes, and then pressed at 130° C for 3 minutes to form 200 μ-thick sheets. Each sheet was sandwiched between two sheets of 300 μ-thick natural fiber (cotton) fabric. The sandwich combinations were preheated to varying temperatures as shown in Table 4, and were pressed at a pressure of 1 kg/cm² for 1 second to form hot melt bonded structures of the fibrous material. During the pressing the sandwich structures were observed for an indication of bleeding. The 1,2-polybutadiene-based composition exhibited an excellent non-bleeding property.

Table 4

|  | (in parts by weight) Exp. No. 13 | Ref. Ex. No. 9 |
|---|---|---|
| Calcium carbonate | 300 | 300 |
| Atactic polypropylene | 50 | 50 |
| Naphthenic oil | 10 | 10 |
| 1,2-Polybutadiene | 100 | — |
| EVA copolymer | — | 100 |
| Apparent melt viscosity (poise) | 17000 | 12000 |
| Bleeding |  |  |
| Press temp. 100° C | No | No |
| 110° C | No | Yes |
| 120° C | No | Yes |
| 130° C | Yes | Yes |

Notes:
(1) Melt viscosity was determined in the same way as Example 2.
(2) For the determination of bleeding, test pieces of the hot melt bonded fibrous material were pressed at varying temperatures and were visually inspected for any evidence of bleeding.

EXAMPLE 6

Five different compositions were prepared by adding an inorganic filler (talc or aluminum hydroxide), tackifier (atactic polypropylene), and plasticizer (naphthenic oil) in varied proportions as shown in Table 5 to each 100 parts by weight of a 1,2-polybutadiene having a 1,2-bond structure content of 90%, crystallinity of 24%, and intrinsic viscosity $[\eta]_{30°}$ $c^{toluene}$ of 1.25, an SBS copolymer having a styrene content of 30 wt.%, an SIS copolymer with a styrene content of 14 wt.%, or an EVA copolymer having a vinyl acetate content of 28 wt.%. Each composition was kneaded by mixing roll at from 70° to 80° C for 15 minutes, and then pressed at 130° C for 3 minutes to form a 200 μ-thick sheet. The sheet was sandwiched between a 300 μ-thick sheet and a 600 μ-thick sheet of natural fiber (cotton) fabric. The sandwich combination was preheated to 130° C, and passed through two rolls with a nip of 600 μ at 130° C so that a hot melt bonded laminate of the fibrous material was continuously formed at a take off velocity of 1 meter per minute. The bond strength values of the products thus obtained were as shown in Table 5.

As can be seen from the table 5, the 1,2-polybutadiene-based compositions provide adequate bond strength despite continuous hot melt bonding, thus exhibiting better adhesiveness than the SBS, SIS, and EVA copolymer-based compositions.

Table 5

|  | (in parts by weight) | | | | |
|---|---|---|---|---|---|
|  | Exp. No. | | | Ref. Ex. No. | |
|  | 14 | 15 | 10 | 11 | 12 |
| Talc | 300 | — | 300 | 300 | 300 |
| Aluminum hydroxide | — | 300 | — | — | — |
| Atactic polypropylene | 50 | 50 | 50 | 50 | 50 |
| Naphthenic oil | 10 | 10 | 10 | 10 | 10 |
| 1,2-Polybutadiene | 100 | 100 | — | — | — |
| SBS copolymer | — | — | 100 | — | — |
| SIS copolymer | — | — | — | 100 | — |
| EVA copolymer | — | — | — | — | 100 |
| Apparent melt viscosity (poise) | 17000 | 11000 | 65000 | 33000 | 11000 |
| Peeling strength (g/cm) | 1000 | 1000 | 250 | 800 | 830 |

Note:
Melt viscosity and peeling strength were determined by the same procedures as in Example 2.

EXAMPLE 7

One hundred parts by weight of a 1,2-polybutadiene with a 1,2-bond structure content of 90%, crystallinity of 24%, and intrinsic viscosity $[\eta]_{30^\circ}\ c^{toluene}$ of 1.87 were mixed with an inorganic filler (calcium carbonate), tackifiers (petroleum resin "Toho High-Resin #60" and atactic polypropylene), plasticizer (naphthenic oil), and flow improving agent (145° F paraffin wax), the compounding agents being varied in proportions as shown in Table 6. Each composition was compounded on a 5 liter kneader at 120° C for 20 minutes and passed through two rolls at 25° C to form a sheet, which in turn was pelletized on a sheet pelletizer. The pellets were extruded through a flat die at a maximum resin temperature of 130° C, and a 150 μ-thick sheet was formed. Before cooling the sheet was sandwiched between two sheets of 450 μ-thick fabric of synthetic fiber(polyvinyl alcohol fiber). The sandwich combination was passed through a 300 μ gap of two rolls at 50° C, and a hot melt bonded laminate of the fibrous material was continuously obtained at a take off speed of 2 m/min.

The bond strength values of the products were determined and are summarized in Table 6. It will be appreciated that the compositions according to the invention provide good adhesion even when employed as hot melt adhesives in the manner just described.

EXAMPLE 8

To 100 parts by weight of a 1,2-polybutadiene having a 1,2-bond structure content of 90%, crystallinity of 24%, and intrinsic viscosity $[\eta]_{30^\circ}\ c^{toluene}$ of 1.20 or an EVA copolymer having a vinyl acetate content of 28 wt.% were added an inorganic filler (calcium carbonate), tackifier (atactic polypropylene), and plasticizer (naphthenic oil) in different proportions as given in Table 7.

Table 6

|  | (in parts by weight) | |
|---|---|---|
|  | Exp. No. | |
|  | 16 | 17 |
| Calcium carbonate | 200 | 300 |
| Petroleum resin | 20 | 30 |
| Paraffin wax | 60 | 60 |
| Naphthenic oil | 20 | 15 |

Table 6-continued

|  | (in parts by weight) | |
|---|---|---|
|  | Exp. No. | |
|  | 16 | 17 |
| Atactic polypropylene | 4 | 8 |
| 1,2-Polybutadiene | 100 | 100 |
| Apparent melt viscosity (poise) | 8100 | 22000 |
| Peeling strength (g/cm) | 1310 | 790 |

Note:
Melt viscosity and peeling strength were determined by the same methods as in Example 2.

Each composition was kneaded by mixing roll at from 70° to 80° C for 15 minutes, and then pressed at 130° C for 3 minutes to form a 200 μ-thick sheet. The sheet was placed between 300 μ- and 600 μ-thick sheets of natural fiber (cotton) fabric, preheated to 130° C on a hot press, and laminated by a pressure of 1 kg/cm² for 1 second. The bond strength, flexibility, bleeding, and rumpling resistance of the test pieces of the hot melt bonded laminates were determined. Table 7 summarizes the results. It will be seen from the table 7 that the 1,2-polybutadiene-based composition is superior in all of the properties tested.

Table 7

|  | (in parts by weight) | |
|---|---|---|
|  | Exp.No. | Ref.Ex.No. |
|  | 18 | 13 |
| Calcium carbonate | 300 | 300 |
| Atactic polypropylene | 50 | 50 |
| Naphthenic oil | 10 | 10 |
| 1,2-Polybutadiene | 100 | — |
| EVA copolymer | — | 100 |
| Apparent melt viscosity (poise) | 17000 | 12000 |
| Peeling strength (g/cm) | 950 | 890 |
| Flexibility (mg) | 1810 | 2140 |
| Bleeding | No | Yes |
| Rumpling resistance |  |  |
| Frequency 200 times | 0/1 | 1/2 |
| 300 times | 1/2 | 3/4 |
| 400 times | 1/2 | 1/1 |

Notes:
(1)Melt viscosity, peeling strength, and bleeding were determined by the same methods as used in Example 2.
(2)Flexibility was determined as follows: Test strips 20 mm wide and 89 mm long were cut out of the hot melt bonded fibrous material and placed on Toyo Seiki Works' Gurley's stiffness tester, and the mean value of the stresses exerted was used as an index of flexibility.
(3)Rumpling resistance was determined in the following way. Test pieces in the form of 20 mm-wide strips cut out of the hot melt bonded fibrous material were tested on Toyo Seiki Works' rumpling resistance tester. The degrees of peeling of the test pieces were expressed in fractions as indices of their rumpling resistance.

EXAMPLE 9

To 100 parts by weight of a 1,2-polybutadiene having a 1,2-bond structure content of 90%, crystallinity of 24%, and intrinsic viscosity $[\eta]_{30^\circ}\ c^{toluene}$ of 1.25 were added a filler (calcium carbonate), tackifier (highly unsaturated petroleum resin "Toho High-Resin #90", the same product being employed in the examples that follow), plasticizer (naphthenic oil), and flow improving agent (paraffin wax) in varied proportions as shown in Table 8. Each composition was compounded on an 8-in. mixing roll at 80° C, and passed through two rolls at 25° C to form a sheet, and then the sheet was pelletized on a sheet pelletizer. Using the pellets and by extrusion forming through a flat die at a maximum resin temperature of 100° C, a 600 μ-thick sheet was formed.

Each 1,2-polybutadiene-based sheet was placed on the rear side of a tufted carpet made of a plain woven fabric of polypropylene split yarns as a primary base material with polypropylene loop piles thereon, and a jute net as a secondary base material was placed on the sheet. The sandwich combination was preheated on a hot press at 130° C for 3 minutes and hot melt bonded by pressing with a pressure of 1 kg/cm² for 1 second. The tufted carpets with jute net backing thus formed were tested for their bond strength and gave the results as summarized in Table 8. Similarly, a commercially available latex compound (Japan Synthetic Rubber's "JSR-CL107," 66% solids) based on a carboxyl-modified styrene-butadiene copolymer was applied on the back side of a tufted carpet at a rate of 0.92 kg solids per square meter. A jute net was placed on the coated surface, and the sandwich was heated dry in an air oven at 150° C for 15 minutes, and then the bond strength was determined.

As will be seen from Table 8, the compositions of Exp. Nos. 19 through 22 provided better adhesion than the synthetic rubber latex. The composition of Exp. No. 22 indicated a tendency of slightly inferior permeability because of a high melt viscosity. Reference Example 14 exhibited very low melt viscosity and inadequate peeling strength.

ized. Using pellets and by the flat-die extrusion forming at a maximum resin temperature of 100° C, a 450 μ-thick sheet was formed. The 1,2-polybutadiene-based sheet was placed on the back side of a tufted carpet fabric made of a plain woven fabric of polypropylene split yarns as the primary base material with polypropylene loop piles thereon. As a secondary base material, a jute net was further placed thereover, and the combination was heated together by a heater, and pressed by a pressure roll, so that a hot melt bonded tufted carpet with jute net backing was continuously formed. During the process the temperature was 130° C and the retention time within the equipment was 40 seconds. The hot melt bonded tufted carpet obtained in this way possessed adequate bond strength and permeability. This indicated that the temperature may be low and the processing time may be short when continuously producing the hot melt bonded tufted carpet having adequate bond strength (Exp. No. 23).

EXAMPLE 11

To 100 parts by weight of a 1,2-polybutadiene having

Table 8

|  | (in parts by weight) | | | | | |
|---|---|---|---|---|---|---|
|  | Exp. No. | | | | Ref. Ex. No. | |
|  | 19 | 20 | 21 | 22 | 14 | 15 |
| Calcium carbonate | 300 | 300 | 300 | 300 | 300 | |
| Highly unsaturated petroleum resin | 250 | 130 | 100 | 50 | 300 | Synthetic rubber latex compound |
| Paraffin wax | 125 | 70 | 50 | 30 | 200 | |
| Naphthenic oil | 10 | 10 | 10 | 10 | 10 | |
| 1,2-Polybutadiene | 100 | 100 | 100 | 100 | 100 | |
| Melt viscosity (poise) | 370 | 700 | 1800 | 8000 | 45 | — |
| Yarn pull-off strength (kg/yarn) | 4.0 | 4.3 | 4.2 | 3.8 | 1.5 | 1.2 |
| Peeling strength (g/cm) | 370 | 500 | 600 | 650 | 100 | 360 |
| Permeability | Good | Good | Good | Fair | Good | Good |

Notes:
(1)Melt viscosity: Determined by Shimadzu Seisakusho's Koka type flow meter using a nozzle 1 mm dia. by 15 mm, under loading of 10 kg/cm² at 130° C.
(2)Yarn pull-off strength: A single pile was pulled off from hot melt bonded laminate of tufted carpet by an Instron type universal tester (at a tensile velocity of 500 mm/min), and the mean stress value was given as the yarn pull-off strength, as an indication of the adhesiveness.
(3)Peeling strength: Each test piece, in the form of 35 mm-wide strip cut out from the hot melt bonded laminate of tufted carpet and jute net, was subjected to T-peeling on an Instron type universal tester (at a tensile velocity of 500 mm/min) to determine the strength of the bond between the fibrous base material of the carpet and the jute net. The mean peeling stress value was expressed as the peeling strength, or another indication of the adhesiveness.
(4)Permeability: Several piles were drawn off from the hot melt bonded tufted carpet, and the state of deposition of the hot melt adhesive on the piles was visually examined as a basis for the evaluation of the adhesive permeabillity.

EXAMPLE 10

To 100 parts by weight of a 1,2-polybutadiene having a 1,2-bond structure content of 90%, crystallinity of 24%, and intrinsic viscosity $[\eta]_{30°}\ c^{toluene}$ of 1.25 were added 300 parts by weight of a filler (calcium carbonate), 100 parts by weight of a tackifier (highly unsaturated petroleum resin), 10 parts by weight of a plasticizer (naphthenic oil), and 50 parts by weight of a flow improving agent (paraffin wax). The mixture was kneaded on an endless kneader and continuously pelleta 1,2-bond structure of 90%, crystallinity of 24%, and intrinsic viscosity $[\eta]_{30°}\ c^{toluene}$ of 1.25 were added a filler (calcium carbonate), tackifier, plasticizer (naphthenic oil), and flow improving agent (paraffin wax) in varying proportions as shown in Table 9. Each composition was kneaded on an 8-in. mixing roll at 80° C, passed through two rolls at 25° C, and the resulting sheet was pelletized by a sheet pelletizer. The pellets were extruded through a flat die at a maximum resin temperature of 100° C, and a 450 μ-thick sheet was formed.

Table 9

|  |  | (in parts by weight) | | | |
|---|---|---|---|---|---|
|  |  | Exp. No. | | | |
|  |  | 24 | 25 | 26 | 27 |
| Calcium carbonate |  | 300 | 300 | 300 | 300 |
| Highly unsaturated petroleum resin ("Toho High-Resin #90") | (1) | 100 | — | — | — |
| Hydrogenated rosin-glycerine ester ("Ester Gum H") | (2) | — | 100 | — | — |
| Rosin-glycerine ester |  | — | — | 100 | — |

Table 9-continued

|  |  | (in parts by weight) Exp. No. | | | |
|---|---|---|---|---|---|
|  |  | 24 | 25 | 26 | 27 |
| ("Ester Gum 105") Alicyclic saturated hydrocarbon resin ("Alicon P-85") | (3) | — | — | — | 100 |
| Paraffin wax | (4) | 50 | 50 | 50 | 50 |
| Naphthenic oil |  | 10 | 10 | 10 | 10 |
| 1,2-Polybutadiene |  | 100 | 100 | 100 | 100 |
| Melt viscosity | (poise) | 2000 | 1800 | 2500 | 1900 |
| Yarn pull-off strength | (kg/yarn) | 3.8 | 3.4 | 3.4 | 3.0 |
| Peeling strength | (g/cm) | 740 | 520 | 500 | 600 |
| Permeability |  | Good | Good | Good | Good |

Note:
1. Melt viscosity, yarn pull-off strength, peeling strength, and permeability were determined by the same methods as employed in Example 9.
2. (1); Toho Chemical Industry Co., Ltd. (2), (3), (4); Arakawa Phosphoric Acid Chemical Co., Ltd.

The 1,2-polybutadiene-based sheet was placed on the back side of a tufted carpet made of a plain woven fabric of polypropylene split yarns as a primary base material with polypropylene loop piles thereon. Next, a jute net was placed thereover as a secondary base material. The sandwich was preheated on a hot press at 130° C for 3 minutes, and then hot melt bonded with a pressure of 1 kg/cm² for one second to form a tufted carpet with jute net backing. The bond strength values of the laminates formed in the manner described were determined and are summarized in Table 9. It can be seen that various compounding agents may be employed as tackifiers for the 1,2-polybutadiene-based compositions of the invention.

EXAMPLE 12

Six varied compositions were prepared by compounding 100 parts by weight of a 1,2-polybutadiene having a 1,2-bond structure content of 90%, crystallinity of 24%, and intrinsic viscosity $[\eta]_{30°}\ c^{toluene}$ of 1.25 with different proportions as shown in Table 10 of a filler (calcium carbonate), tackifier (highly unsaturated petroleum resin), plasticizer (naphthenic oil), and flow improving agent (paraffin wax). Each composition was kneaded on an 8-in. mixing roll at 80° C, and was transferred to a hot press at 130° C, where it was formed into a 600 μ-thick sheet. The 1,2-polybutadiene-based sheet was placed on the back side of a tufted carpet made of a plain woven fabric of polypropylene split yarns as a primary base material with polypropylene loop piles thereon, and a jute net as a secondary base material was placed on the sheet. The sandwich was preheated on a hot press at 130° C for 3 minutes and hot melt bonded with a pressure of 1 kg/cm² for 1 second. The hot melt bonded tufted carpets with jute net backing thus obtained were tested for bond strength. The results are shown in Table 10. The data reflect a tendency toward decreased bond strength with increased filler addition.

Table 10

|  | (in parts by weight) Exp. No. | | | | | |
|---|---|---|---|---|---|---|
|  | 28 | 29 | 30 | 31 | 32 | 33 |
| Calcium carbonate | 200 | 300 | 400 | 500 | 600 | 700 |
| Highly unsaturated petroleum resin | 100 | 100 | 150 | 200 | 250 | 300 |
| Paraffin wax | 50 | 50 | 75 | 100 | 100 | 100 |
| Naphthenic oil | 10 | 10 | 15 | 20 | 20 | 20 |
| 1,2-Polybutadiene | 100 | 100 | 100 | 100 | 100 | 100 |
| Melt viscosity (poise) | 1750 | 1800 | 700 | 200 | 150 | 100 |
| Yarn pull-off strength (kg/yarn) | 5.6 | 4.2 | 4.7 | 3.7 | 3.9 | 3.8 |
| Peeling strength (g/cm) | 600 | 600 | 400 | 300 | 200 | 150 |
| Permeability | Good | Good | Good | Good | Good | Good |

Note:
Melt viscosity, yarn pull-off strength, peeling strength, and permeabiity were determined in the same manner as in Example 9.

EXAMPLE 13

To each 100 parts of a 1,2-polybutadiene (A) having a 1,2-bond structure content of 90%, crystallinity of 17%, and intrinsic viscosity $[\eta]_{30°}\ c^{toluene}$ of 1.19 or a 1,2-polybutadiene (B) having a 1,2-bond structure content of 90%, crystallinity of 24%, and intrinsic viscosity $[\eta]_{30°}\ c^{toluene}$ of 1.25, were added a filler (calcium carbonate), tackifier (highly unsaturated petroleum resin), plasticizer (naphthenic oil), and flow improving agent (paraffin wax) in varying proportions as in Table 11. Each composition was kneaded on an 8-in. mixing roll at 80° C, and then passed through a hot press at 130° C to form a 600 μ-thick sheet.

The 1,2-polybutadiene-based sheet thus formed was placed on the rear side of a tufted carpet made of a plain woven fabric of polypropylene split yarns as a primary base material with polypropylene loop piles thereon, and a jute net as a secondary base material was placed on the sheet. The triple-layer structure was preheated on a hot press at 130° C for 3 minutes, and then hot melt bonded with a pressure of 1 kg/cm² for 1 second. The bond strength values of such hot melt bonded tufted carpets with jute net backing were determined and are compiled in Table 11.

It is clear from the table that 1,2-polybutadienes of different degrees of crystallization are useful as they provide substantially unchanged bond strength.

Table 11

| | Exp. No. (in parts by weight) | | | |
|---|---|---|---|---|
| | 34 | 35 | 36 | 37 |
| Calcium carbonate | 300 | 300 | 300 | 300 |
| Highly unsaturated petroleum resin | 100 | 100 | 130 | 130 |
| Paraffin wax | 50 | 50 | 70 | 70 |
| Naphthenic oil | 10 | 10 | 10 | 10 |
| 1,2-Polybutadiene (A) | 100 | — | 100 | — |
| 1,2-Polybutadiene (B) | — | 100 | — | 100 |
| Melt viscosity (poise) | 2800 | 1800 | 680 | 710 |
| Yarn pull-off strength (kg/yarn) | 4.2 | 4.2 | 4.4 | 5.2 |
| Peeling strength (g/cm) | 600 | 600 | 650 | 600 |
| Permeability | Good | Good | Good | Good |

Note:
Melt viscosity, yarn pull-off strength, peeling strength, and permeability were determined in the same way as described in Example 9.

EXAMPLE 14

To 100 parts by weight of a 1,2-polybutadiene having a 1,2-bond structure content of 90%, crystallinity of 24%, and intrinsic viscosity $[\eta]_{30°} \cdot c^{toluene}$ of 1.25 were added a filler (calcium carbonate), tackifier (highly unsaturated) petroleum resin), plasticizer (naphthenic oil), and flow improving agent (paraffin wax) in varied proportions as shown in Table 12. Each composition was kneaded on an 8-in. mixing roll at 80° C, and then formed into a 600 μ-thick sheet on a hot press at 130° C. The 1,2-polybutadiene-based sheet was placed on the back side of a tufted carpet made of a plain woven fabric of polypropylene split yarns as a base material and having polypropylene loop piles thereon. The two layers were preheated on a hot press at 130° C for 3 minutes, and then hot melt bonded with a pressure of 1 kg/cm² for one second. The hot melt bonded tufted carpets thus obtained were tested for bond strength, and results as given in Table 12 were obtained.

From these experiments it was found that adequate bond strength is obtained without the use of a secondary base material (e.g., a jute net). The tufted carpet processed in this way has a smooth hot melt coated surface, and it is possible to dispense with any secondary base material in the manufacture of said tufted carpets.

Table 12

| | Exp. No. (in parts by weight) | | |
|---|---|---|---|
| | 38 | 39 | 40 |
| Calcium carbonate | 300 | 300 | 300 |
| Highly unsaturated petroleum resin | 120 | 140 | 160 |
| Paraffin wax | 60 | 70 | 80 |
| Naphthenic oil | 10 | 10 | 10 |
| 1,2-Polybutadiene | 100 | 100 | 100 |
| Melt viscosity (poise) | 1300 | 620 | 500 |
| Yarn pull-off strength (kg/yarn) | 4.5 | 4.0 | 3.9 |
| Permeability | Good | Good | Good |

Note:
Melt viscosity, yarn pull-off strength, and permeability were determined by the same methods as used in Example 9.

EXAMPLE 15

Using an arrangement as illustrated in FIG. 1, a cut type tufted carpet was backed.

First, calcium carbonate, paraffin wax (m.p. 145° F), petroleum resin ("Toho High-Resin #60"), and naphthenic oil were added in varied proportions as shown in Table 13 to 100 parts by weight of a polybutadiene having a 1,2-bond structure content of 90%, crystallinity of 24%, and intrinsic viscosity $[\eta]_{30°} \cdot c^{toluene}$ of 1.25. Each mixture was kneaded in a 5 liter kneader at 120° C for 20 minutes. Next, the composition was passed through two rolls at 25° C, and the resulting sheet was pelletized by a sheet pelletizer. In the manner described, two types of hot melt adhesives differing in melt viscosity were prepared.

Table 13

| | (in parts by weight) | |
|---|---|---|
| Hot melt adhesive No. | (1) | (2) |
| Calcium carbonate | 50 | 200 |
| Paraffin wax | 90 | 80 |
| Petroleum resin | 150 | 10 |
| Naphthenic oil | 10 | 20 |
| 1,2-Polybutadiene | 100 | 100 |
| Apparent melt viscosity (poise) | 83 | 1100 |

Figure 2:
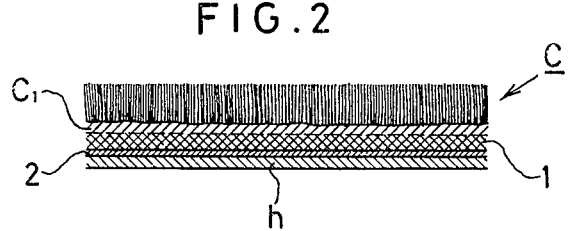
FIG. 2 is a cross-sectional view of the product of the invention.

The hot melt adhesive composition with a lower melt viscosity (1) was heated and melted in a melting pan $a$ at 130° C. The molten adhesive (1) was applied by means of a first roll $b$ on the back side of a sheet of unbacked carpet $c$ so as to fix the fibrous base material of the carpet. The amount of the adhesive being applied was controlled by a doctor blade $d$. Concurrently, pellets of the hot melt adhesive composition with a higher melt viscosity (2) were extruded through a flat die extruder $e$ designed for a maximum resin temperature of 100° C to form a 300 μ-thick sheet. The sheet was continuously pressed against the carpet $c$ and, at the same time, combined with a secondary base fabric $h$ by means of a pair of rolls, i.e., a second roll $f$ maintained at 25° C and a third roll $g$ at 50° C. In this manner a backed carpet $i$ was manufactured in uninterrupted operation. The carpet thus obtained is shown in cross section in FIG. 2, wherein the reference character $c$ generally designates the original sheet of unbacked carpet, $c_1$ is the fibrous base material, 1 is the hot melt adhesive of low melt viscosity with which the fibrous base material is impregnated, 2 is the hot melt adhesive of high melt viscosity, and $h$ is the secondary base fabric. The unbacked carpet $c$ used in the experiment was made of a plain woven fabric of polypropylene split yarns as the primary base fabric and had polypropylene cut type piles. The unbacked carpet was 40 mm in thickness. The secondary base fabric was a plain woven fabric of jute having a thickness of 1.0 mm.

The specimens of carpets thus backed with the adhesives of different compositions on the apparatus described above were tested for their bond strength. Table 14 gives a summary of the results.

Similarly, in the usual manner, a commercially available latex compound (Japan Synthetic Rubber's "JSR-C1101") based on a carboxy-modified styrene-butadiene copolymer rubber was applied, at a rate of 0.92 kg solids per square meter, on the back side of the same unbacked carpet of cut type tufting as used in the preceding experiments. The coated surface was superposed with the same secondary back fabric and pressed together by the rolls. The backed carpet was cured and dried on an air oven at 150° C for 15 minutes, and its bond strength was determined. It will be readily understood upon comparison that the process of the invention provides better backing of carpets than by the conventional methods.

Table 14

|  | Exp. No. 41 | 42 | 43 | 44 | Ref. Ex. |
|---|---|---|---|---|---|
| Gap between (d) and (b) (mm) | 0.3 | 0.4 | 0.4 | 0.3 | |
| Rotational speed of (b), (f), (g) (m/min) | 0.6 | 1.5 | 1.5 | 2.0 | Synthetic rubber latex compd. |
| Nip between rolls (b) and (f) (mm) | 3.0 | 3.0 | 3.0 | 2.5 | |
| Nip between rolls (f) and (g) (mm) | 4.0 | 4.0 | 4.5 | 4.0 | |
| Yarn pull-off strength (kg/yarn) | 3.5 | 3.5 | 4.1 | 3.9 | 2.3 |
| Peeling strength, secondary base fabric (kg/cm) | 0.68 | 0.59 | 0.58 | 0.55 | 0.44 |
| Abrasion loss* (g) | 0.27 | 0.23 | 0.29 | 0.28 | 0.35 |
| Pile condition** | Good | Good | Good | Good | Good |

Notes:
*Abrasion loss was determined by Toyo Seiki Works' taper type abrasion tester, with 1000 revolutions of an "S-32" abrasion wheel under a load of 500 g over the piled surface of the backed carpet. The loss due to the abrasion was used as an index of the bond strength.
**Pile condition was evaluated by visually judging the degree of flattening of the piles on the carpet backed by the roll pressing.

What is claimed is:

1. A hot melt adhesive composition consisting essentially of 100 parts by weight of polybutadiene having a 1,2-bond structure content of not less than 70% and a crystallinity of not less than 10%, from 50 to 1000 parts by weight of at least one inorganic filler, from 10 to 300 parts by weight of at least one tackifier, and at least one of plasticizer and/or at least one of flow improving agent, said composition having an melt viscosity of from 50 to 50,000 poises within a temperature range from 100° to 150° C.

2. A hot melt adhesive composition according to claim 1 wherein the polybutadiene has a 1,2-bond structure content of not less than 80%.

3. A hot melt adhesive composition according to claim 1 wherein the polybutadiene has a crystallinity of from 10% to 50%.

4. A hot melt adhesive composition according to claim 1 wherein the polybutadiene has an intrinsic viscosity [$\eta$] of from 0.7 to 3.0 as measured in toluene at 30° C.

5. A hot melt adhesive composition according to claim 1 wherein the polybutadiene has an intrinsic viscosity [$\eta$] of from 1.0 to 2.0 as measured in toluene at 30° C.

6. A hot melt adhesive composition according to claim 1 wherein the composition contains from 100 to 700 parts by weight of at least one inorganic filler.

7. A hot melt adhesive composition according to claim 1 wherein the composition contains from 200 to 400 parts by weight of at least one inorganic filler.

8. A hot melt adhesive composition according to claim 1 wherein the composition contains from 50 to 300 parts by weight of at least one tackifier.

9. A hot melt adhesive composition according to claim 1 wherein the composition contains from 100 to 200 parts by weight of at least one tackifier.

10. A hot melt adhesive composition according to claim 1 wherein the composition has a melt viscosity of from 50 to 5000 poises.

11. A hot melt adhesive composition for hot melt bonding of fibrous or surface porous materials consisting essentially of 100 parts by weight of polybutadiene having a 1,2-bond structure content of not less than 70% and a crystallinity of not less than 10%, from 50 to 1000 parts by weight of at least one inorganic filler, from 10 to 300 parts by weight of at least one tackifier, and at least one of plasticizer and/or at least one of flow improving agent, said composition having a melt viscosity of from 50 to 50,000 poises within a temperature range from 100° to 150° C.

12. A hot melt adhesive composition according to claim 11 wherein the fibrous or surface-porous material is at least one material selected from the group consisting of woven fabrics, non woven fabrics and carpets made of synthetic, and natural fibers and their combinations, paper and boards, synthetic resins, artificial leathers, synthetic rubber foams, natural leathers, felts, and wood and wood products.

13. A hot melt adhesive composition according to claim 1 wherein the inorganic filler is at least one substance selected from the group consisting of calcium carbonate, aluminum hydroxide, talc, magnesium carbonate, silicic acid, silicate, asbestos powder, aluminum oxide, carbon black and clay in particulate form ranging in particle size from 0.01 to 100 $\mu$.

14. A hot melt adhesive composition according to claim 1 wherein the tackifier is at least one compound selected from the group consisting of rosin and rosin derivatives, pinene polymers, dipentene polymers, cumarone-indene resins, petroleum resins, atactic polypropylenes, low molecular weight polystyrenes, and phenol resins.

15. A hot melt adhesive composition according to claim 1 wherein the plasticizer is a liquid organic substance of low volatility.

16. A hot melt adhesive composition according to claim 1 wherein the flow improving agent is at least one substance selected from the group consisting of paraffin waxes, microcrystalline waxes, low molecular weight polyethylenes, and chlorinated paraffin.

17. A hot melt adhesive composition for backing of carpet consisting essentially of 100 parts by weight of polybutadiene having a 1,2-bond structure content of not less than 70% and a crystallinity of from 10% to 50% and intrinsic viscosity [$\eta$] of from 1.0 to 2.0 as measured in toluene at 30° C, from 100 to 700 parts by weight of at least one inorganic filler, from 50 to 300 parts by weight of at least one tackifier, and at least one of plasticizer and/or at least one of flow improving agent, said composition having a melt viscosity of from 100 to 5000 poises at 130° C.

* * * * *